| (12) | United States Patent<br>Lakshmikanthan et al. | (10) Patent No.: US 12,299,405 B2<br>(45) Date of Patent: *May 13, 2025 |
|---|---|---|

(54) INTENT-BASED QUERY AND RESPONSE ROUTING BETWEEN USERS AND BACKEND SERVICES

(71) Applicant: Palo Alto Networks, Inc., Santa Clara, CA (US)

(72) Inventors: Ramanathan Lakshmikanthan, Santa Clara, CA (US); Sameer Dilip Merchant, Sunnyvale, CA (US); Gaurav Sharma, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,395

(22) Filed: Dec. 26, 2023

(65) Prior Publication Data

US 2025/0068857 A1 Feb. 27, 2025

Related U.S. Application Data

(63) Continuation of application No. 18/455,165, filed on Aug. 24, 2023, now Pat. No. 11,893,358.

(51) Int. Cl.
```
G06F 40/40        (2020.01)
G06F 16/332       (2019.01)
G06F 16/3329      (2025.01)
```
(52) U.S. Cl.
CPC .......... *G06F 40/40* (2020.01); *G06F 16/3325* (2019.01); *G06F 16/3329* (2019.01)

(58) Field of Classification Search
CPC .... G06F 40/40; G06F 16/3325; G06F 16/332; G06F 16/3329
See application file for complete search history.

(56) References Cited

U.S. PATENT DOCUMENTS

| 11,527,237 | B1 * | 12/2022 | Sarikaya ................. G10L 13/08 |
| 11,811,719 | B1 * | 11/2023 | Maney, Jr. ............... G06F 3/165 |
| 2020/0050949 | A1 | 2/2020 | Sundararaman et al. |

(Continued)

OTHER PUBLICATIONS

PCT Application No. PCT/US2024/043011, International Search Report & Written Opinion mailed Nov. 4, 2024, 12 pages.

(Continued)

*Primary Examiner* — Huyen X Vo
(74) *Attorney, Agent, or Firm* — Gilliam IP PLLC

(57) ABSTRACT

For a seamless and robust artificial intelligence-based assistant experience, an intent-based query and response router has been designed to operate as an intelligent layer between a user and multiple backend services that may respond to one or more queries over the course of a conversation with the user. The query router interacts with an intent classification service to obtain an intent classification for a prompt that is based on a user query. The query router uses the intent classification, which is used as an identifier of a backend service, to route the user query to an appropriate one (or more) of the backend services. When a response is detected, the query router determines a corresponding conversation and provides the response for the conversation.

20 Claims, 5 Drawing Sheets

(56) References Cited

U.S. PATENT DOCUMENTS

2022/0229832 A1    7/2022  Li et al.
2023/0065776 A1    3/2023  Juan
2024/0303441 A1*  9/2024  Sobhy Deraz .......... G06F 40/18

OTHER PUBLICATIONS

Chalef, "Building an Intent Router with Langchain and Zep", [online], [retrieved on Aug. 3, 2023] Retrieved from the Internet: <https://blog.getzep.com/building-an-intent-router-with-langchain-and-zep/>, Jun. 29, 2023, 13 pages.

Hassan, et al., "ChatGPT as your Personal Data Scientist", arXiv:2305.13657v1 [cs.CL], 35 pages, May 23, 2023.

Roy, et al., "Conversation Style Transfer using Few-Shot Learning", arXiv:2302.08362v1, 24 pages, Feb. 16, 2023.

Wang, et al., "Tabi: An Efficient Multi-Level Inference System for Large Language Models", EuroSys '23: Proceedings of the Eighteenth European Conference on Computer Systems, May 2023, pp. 233-248, <https://doi.org/10.1145/3552326.3587438>.

* cited by examiner

INTENT-BASED QUERY AND RESPONSE ROUTING BETWEEN USERS AND BACKEND SERVICES

BACKGROUND

The disclosure generally relates to computing arrangements based on specific computational models (e.g., CPC G06N) and to transmission of digital information (e.g., CPC H04L).

A "Transformer" was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a foundational model and there has been subsequent research in similar Transformer-based sequence modeling. Architecture of a Transformer model typically is a neural network with transformer blocks/layers, which include self-attention layers, feed-forward layers, and normalization layers. The Transformer model learns context and meaning by tracking relationships in sequential data. Some large scale language models ("LLMs") are based on the Transformer architecture. With Transformer-based LLMs, the meaning of model training has expanded to encompass pre-training and fine-tuning. In pre-training, the LLM is trained on a large training dataset for the general task of generating an output sequence based on predicting a next sequence of tokens. In fine-tuning, various techniques are used to fine tune the training of the pre-trained LLM to a particular task.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

A chatbot is one type of conversational agent. While the underlying algorithms for chatbots can vary, many chatbots now use large language models (LLMs), especially generative pre-trained LLMs. Chatbots also employ intent prediction to increase the quality of responses. Chatbots, sometimes referred to as virtual agents or virtual assistants, have been used to aid customers with simple troubleshooting and assistance with products and/or services. However, an enterprise customer often has multiple products and/or multiple licenses for multiple services. A chatbot for each product or service creates a fragmented user experience that also fails to acknowledge the synergy among products/services. For a seamless and more robust experience, an intent-based query and response router has been designed to operate as an intelligent layer between a user and multiple backend services that may respond to one or more queries over the course of a conversation with the user. The query router interacts with an intent classification service to obtain an intent classification for a prompt that is based on a user query. The query router uses the intent classification, which is used as an identifier of a backend service, to route the user query to an appropriate one (or more) of the backend services. When a response is detected, the query router determines a corresponding conversation and provides the response for the conversation.

Example Illustrations

Figure 1:
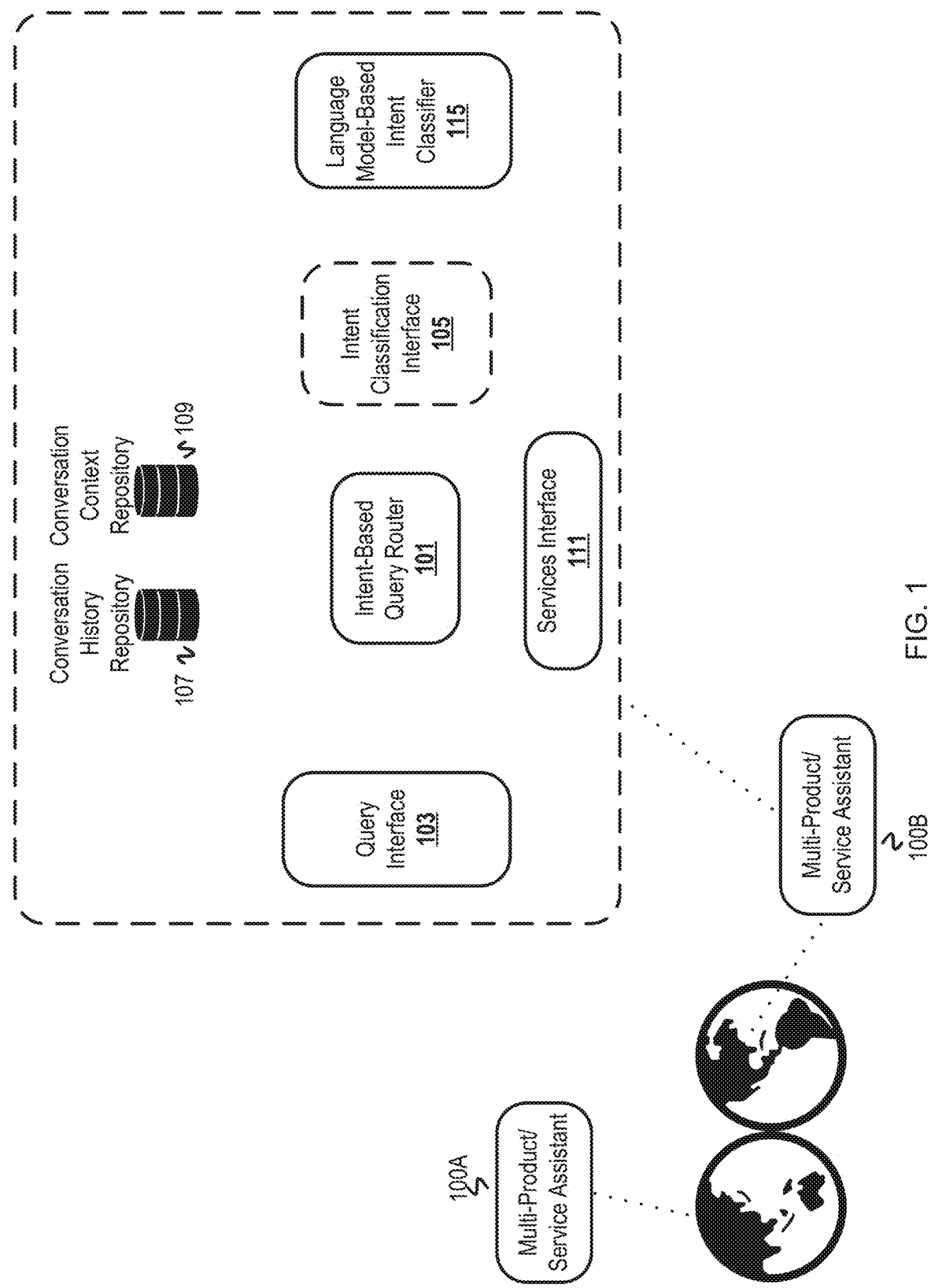
FIG. 1 is a conceptual diagram of a multi-product/service assistant that routes user queries to one or more backend services based on intent classifications predicted for the user queries.

FIG. 1 is a conceptual diagram of a multi-product/service assistant that routes user queries to one or more backend services based on intent classifications predicted for the user queries. FIG. 1 depicts multi-product/service assistants 100A, 100B indicative of assistants deployed across regions. A region can have multiple instances of multi-product/service assistants to allow load balancing of users. The assistants 100A, 100B are referred to as "multi-product/service" assistants because their architecture and programming has been designed to handle user queries for multiple products and/or services of an enterprise customer/tenant. Within a single session, a user may submit queries related to data exploration, customer support, on-demand troubleshooting, and policy creation. A single interface facilitated by the multi-product/service assistant allows a customer to have an efficient, seamless experience across different types of users for numerous products/services that are a mixture of cloud-based and on-premises.

FIG. 1 depicts the multi-product/service assistant 100B as having multiple components. The multi-product/service assistant 100B includes a query interface 103, an intent-based query router 101, a conversation history repository 107 and a conversation context repository 109, an intent classification interface 105, a language model-based intent classifier 115, and a services interface 111. The intent-based query router 101 receives user queries via the query interface 103 and responds to user queries via the query interface 103. As an example, the query interface 103 can be implemented as an application programming interface (API).

The intent-based query router 101 uses the repositories 107, 109 to store information for tracking conversation state, possibly disambiguate queries, and edit responses across multiple sessions of conversations with different users. The intent-based query router 101 uses the conversation history repository 107 and the conversation context repository 109 to track state transitions in a conversation and context data for a conversation, respectively. Conversation history can be limited to capability of the repository 107 (e.g., a rolling log of queries and responses up to a threshold number of tokens that can be accommodated by the repository 107). The intent-based query router 101 also uses the repository 107 to track conversation transitions (e.g., awaiting a prompt or obtaining response and topic transitions). The intent-based query router 101 uses the conversation context repository 109 to store customer attributes and/or user attributes relevant to a conversation. For example, the intent-based query router 101 may obtain role of a digital identity associated with a conversation and current products and/or services of a customer and store the information into the conversation context repository 109.

The intent-based query router 101 submits a prompt to the language model-based intent classifier 115 via the intent classification interface 105 and obtains predicted intent classifications from the intent classifier 115 via the intent classification interface 105. The intent classification interface 105 is depicted in a dashed line as an indication of it being an optional component since the intent-based query router 101 may directly invoke/run the intent classifier 115 and receive its output. However, a more modular design with the intent classification interface 105 allows model maintenance and other changes to be done without impacting programming of the intent-based query router 101. For example, the intent classifier 115 can be an intent classification service implemented with multiple classifiers. Even if a same organization maintains the intent-based query router 101 and the intent classification service, models can be added or removed and processing of outputs (e.g., aggregation, single selection, etc.) can be efficiently managed separate from the intent-based query router 101. The language model-based intent classifier 115 can be a transformer-based LLM but can be other text generation tools tuned for intent classification.

The intent classifier 115 was trained or fine-tuned to predict an intent classification that is a backend service identifier (also referred to as a known destination) or that maps to a backend service identifier. Training of the model uses a training dataset created with tuples of example prompts and intents. For example, the training dataset can include user queries labeled with intents that are backend service identifiers or that map to backend service identifiers. With the purpose of intent classification being to classify intent of a user based on the input from the user, then the intent is either the intended backend service or an intent that maps to a backend service. For instance, a user query may be classified with an intent class of "configuring security policy" and this intent can map to "security configuration agent." Subsequent training can be performed with user queries with confirmed intents.

The intent-based query router 101 communicates user queries associated with intent classifications to backend services via the services interface 111 and obtains query responses from the backend services via the services interface 111. The services interface 111 may also be an API or can be a set of queues or buffers configured according to a publisher-subscriber (or producer-consumer) paradigm. Since the multi-product/service assistant 100B manages conversations across multiple users, the intent-based query router 101 will tag (or otherwise associate) user queries with conversation identifiers that persist through the services interface 111.

Figure 2:
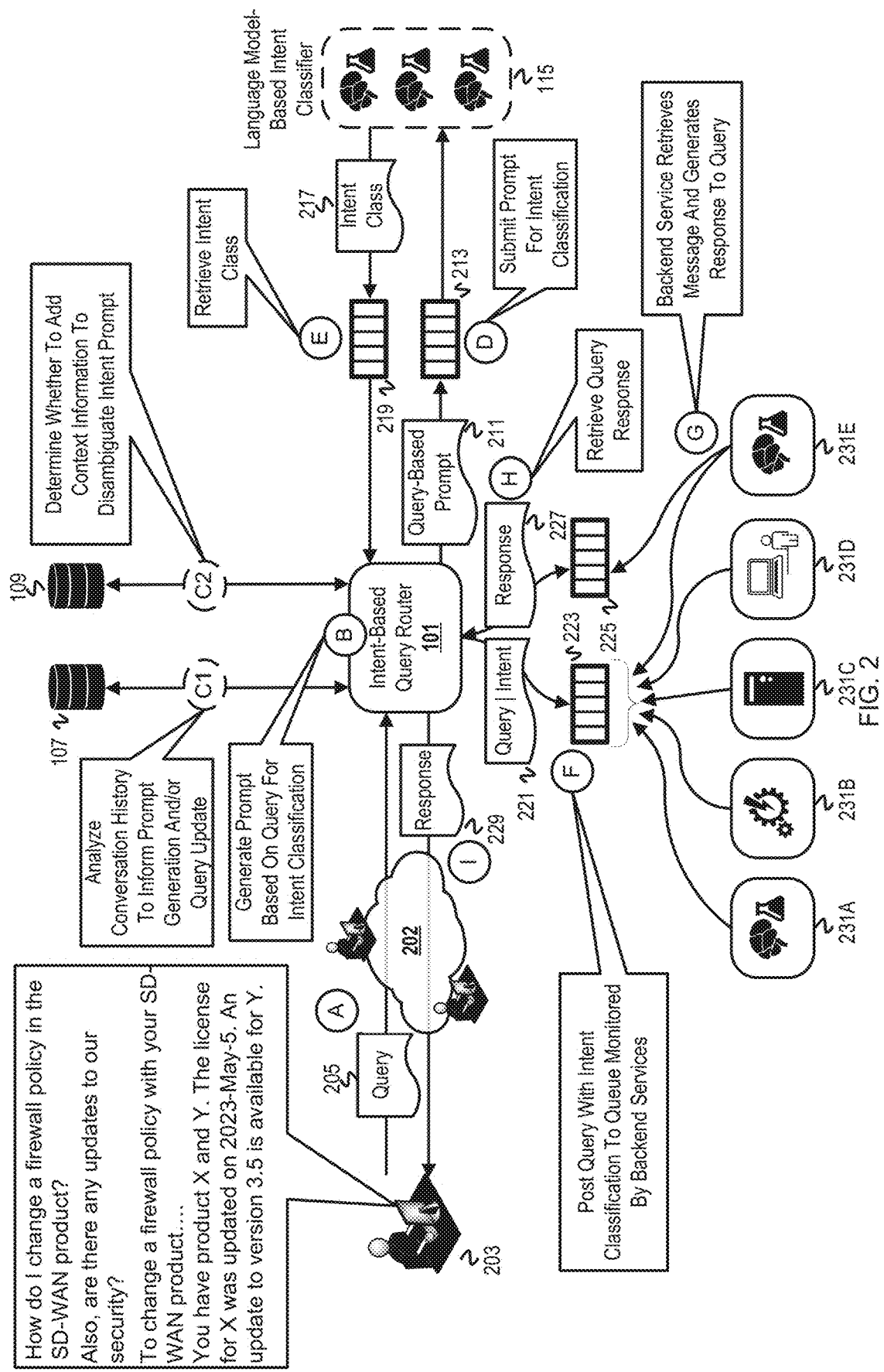
FIG. 2 is a diagram illustrating an example multi-product/service assistant routing a user query and responding to the user query.

FIG. 2 is a diagram illustrating an example multi-product/service assistant routing a user query and responding to the user query. The intent-based query router 101 as depicted in FIG. 2 operates asynchronously with respect to backend services and the language model-based intent classifier 115 by utilizing queues. The intent-based query router 101 interacts with the language model-based intent classifier 115 via queues 213, 219. FIG. 2 depicts the intent-based query router 101 interacting with backend services via message queues 223, 225. FIG. 2 depicts backend services 231A-231E with various icons to represent the different possible backend services that can provide query responses to the intent-based query router 101. The icons for the backend services 231A-231E represent language model-based services, a data analysis service, and a live support service. Presumably, each service is trained or configured for a subset of products and/or services offered by an organization corresponding to the multi-product/service assistant. Each of the backend services 231A-231E is associated with one or more service identifiers that have been used as intent classifications to train the language model-based intent classifier 115 to predict intent classification based on user queries.

In FIG. 2, the language model-based intent classifier 115 is depicted with multiple models. Outputs of the models can include predicted intent classifications and confidence values. The intent-based query router 101 can select from multiple predicted intent classifications based on a confidence threshold. In some cases, the language model-based intent classifier 115 can be implemented to limit output to a single predicted intent classification. For example, an ensemble can be used for the intent classifier with an aggregation technique (e.g., voting) to determine which predicted intent classification is output to the intent-based classifier 101.

FIG. 2 is annotated with a series of letters A, B, C1, C2, D-I indicating stages of operations, each of which represents one or more operations. Although these stages are ordered for this example, the stages illustrate one example to aid in understanding this disclosure and should not be used to limit the claims. Subject matter falling within the scope of the claims can vary from what is illustrated.

In FIG. 2, multiple users, including a user 203, conduct conversations with multiple backend services via the intent-based query router 101. For the conversation of user 203, the user 203 submits multiple queries. A first user query is "How do I change a firewall policy in the SD-WAN product?" and a second user query is "Also, are there any updates to our security?" Each of these user queries is submitted via a network 202 (e.g., public network or the Internet) since the multi-product/service assistant in this illustration is presumed to be deployed as a remote service.

At stage A, a user query 205 traverses the network 202 and is received by the intent-based query router 101. The query 205 is a generic representation of a user query since illustrating the path of each query is not practical in the limited drawing space. As mentioned with reference to FIG. 1, the query 205 may be submitted in an application message via an API.

The process of obtaining an intent classification based on a user query can vary depending upon implementation, the user query, and state of the conversation. At stage B, the intent-based query router 101 generates prompt 211 based on the user query 205 for intent classification. The prompt 211 may be the query 205 or may be a modified version of the query 205. For instance, the intent-based query router 101 may pre-process the query 205 to lint the query 205 which yields the prompt 211. Stages C1 and C2 represent stages of operations for obtaining additional information to inform the generation of the prompt 211. Either or both of C1 and C2 may or may not be performed depending upon implementation, the user query, and state of the conversation. At stage C1, the intent-based query router 101 accesses the conversation history repository 107 to analyze conversation history. As an example, the intent-based query router 101 may analyze the conversation history to determine topic transition. In addition, the intent-based query router 101 updates state of the conversation to reflect receipt of an utterance or query from the user. Based on conversation history, the intent-based query router 101 may add an indication of a current topic to the query 205 to form the prompt 211. At stage C2, the intent-based query router 101 determines whether additional text should be added to the query 205 to form the prompt 211 to provide context to the intent classifier 115. The context information may be used to disambiguate the query 205 and form the prompt 211. The intent-based query router 101 can determine whether disambiguation is needed based on programmed rules (e.g., a query that only has generic tokens such as "what is that") or a response from the classifier 115 that fails to provide an intent classification. Context information can be the products or services of a customer, a geographic region, etc.

At stage D, the intent-based query router 101 submits the formed prompt 211 to the queue 213 from which the intent classifier 115 retrieves prompts for predicting intent classifications. Since the intent-based query router 101 manages queries and responses across multiple conversations and multiple users, the intent-based query router 101 uses tracking information to ensure correct associations of intent classifications with user queries and query responses with user queries. For instance, the intent-based query router 101 may tag the prompt 211 with a conversation identifier that is not input into the intent classifier 115 but travels with the prompts and corresponding output.

At stage E, the intent classifier 115 returns a predicted intent classification or intent class 217 to the intent-based query router 101 via the queue 219. Use of the queue 219 allows the intent-based query router 101 to process other intent classifications, user queries, and query responses while the intent classifier 115 generates predicted intent classifications. When the intent-based query router 101 detects the response from the intent classifier 115, the intent-based query router 101 retrieves the response to determine whether the response indicates a failure code or an intent class and then processes the response for the corresponding conversation. In this illustration, the intent classifier 115 has provided the intent class 217.

At stage F, the intent-based query router 101 posts a message 221 that indicates the user query 205 (or a version of the user query 205) and the intent class 217 to the queue 223. The intent-based query router 101 also associates the message 221 with a conversation identifier. The backend services 231A-231E monitor the queue 223 for messages with an intent class that is their service identifier or maps to their service identifier. Depending on implementation, an intent class can be or map to more than one service identifier. In this example, the backend service 231E is identified by the intent class 217 in the message 221.

At stage G, the backend service 231E retrieves the message 221 and generates a response to the query indicated in the message 221. The backend service 231E creates a message 227 that includes the generated response and an indication of the conversation identifier and posts the message 227 to the queue 225. For example, the conversation identifier can be embedded in a header of the message 227. Implementations may indirectly indicate a conversation identifier with the user query and response. For instance, the intent-based query router 101 may map a message identifier to the conversation identifier. The message 221 and the message 227 would include the message identifier that the intent-based query router 101 can resolve to the conversation identifier.

At stage H, the intent-based query router 101 detects a message in the queue 225, which is the message 227. The intent-based query router 101 retrieves the query response message 227 and determines which conversation corresponds to the query response within the message 227.

At stage I, the intent-based query router 101 provides the query response from the backend service 231E to the user 203. The intent-based query router 101 may edit a response from a backend service before providing the response to a user. This is discussed with reference to the flowcharts below.

The following flowcharts describe example operations of an intent-based classifier instead of the multi-product/service assistant. A multi-product/service assistant may include a frontend or user interface, but does not necessarily include a frontend or user interface. In addition, a multi-product/service assistant includes the intent classifier and includes at least some of the backend services that will generate responses to user queries. The intent-based query router, however, directs and manages user queries and query responses independently of whether the other components are implemented as part of the multi-product/service assistant or not. The name, intent-based query router, chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
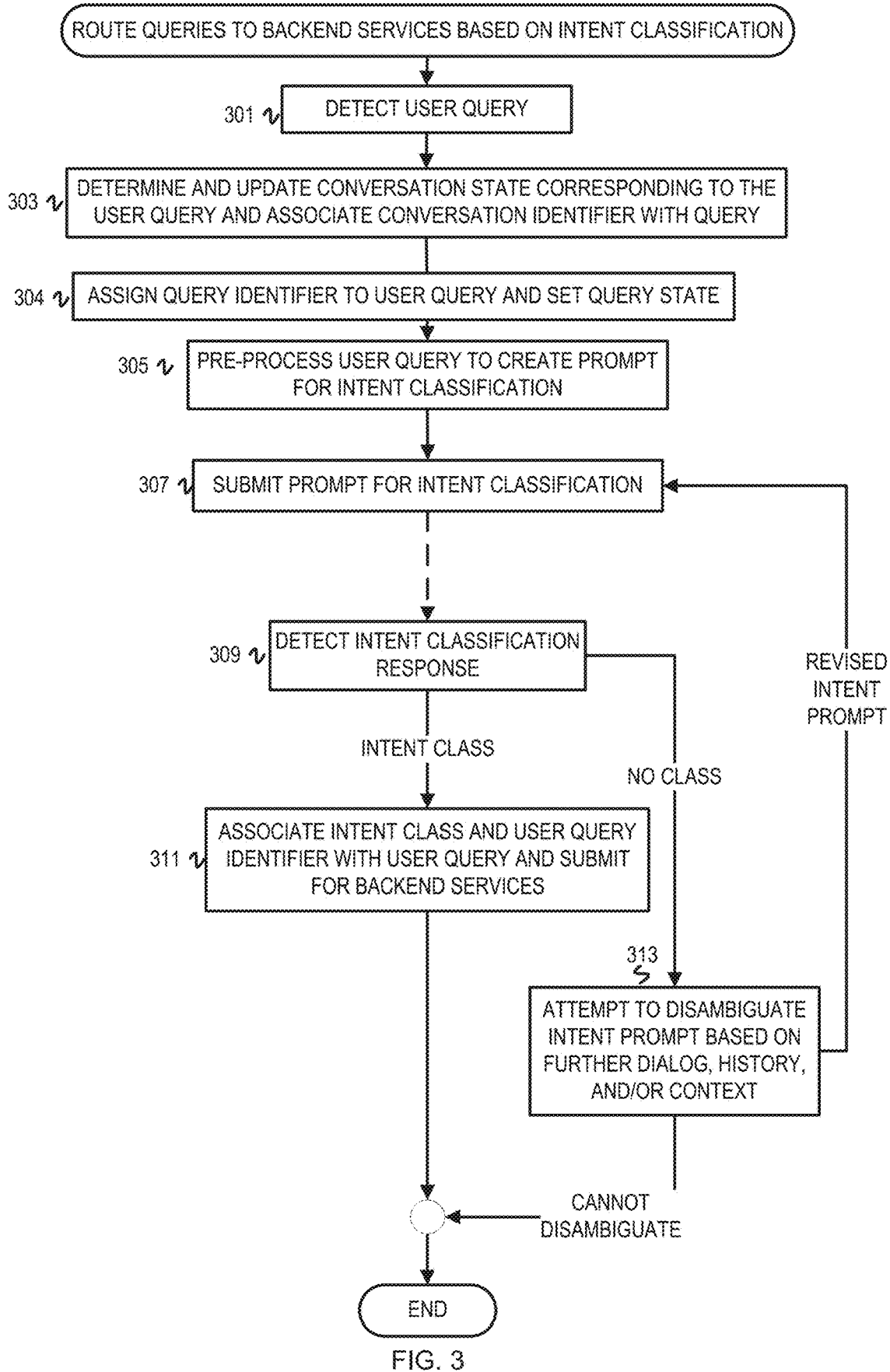
FIG. 3 is a flowchart of example operations for routing user queries to backend services based on intent classification.

FIG. 3 is a flowchart of example operations for routing user queries to backend services based on intent classification. As in the earlier illustrations, it is presumed that an intent-based query router operates asynchronously with respect to backend services that respond to user queries and with respect to an intent classifier.

At block 301, an intent-based query router detects a user query. The user query may be received as an API message, an object in a queue, etc. While a likely deployment of the intent-based query router is cloud computing-based, implementations can deploy the intent-based query router as a component of an on-premises assistant.

At block 303, the intent-based query router determines and updates conversation state corresponding to the user query. The intent-based query router updates conversation state maintained in a repository to reflect receipt of the user query. In addition, the intent-based query router associates or tags the user query with a conversation identifier. Updating conversation state will vary depending upon whether the conversation is new and the length of the conversation. For instance, updating state may involve older utterances in the conversation rolling out of a conversation window limited by resources and/or configuration. Updating state may also involve analysis to determine topic transition. As there are multiple backend services any of which may respond to user queries arising out of a conversation maintained by the intent-based query router, there is effectively multiple layers of conversation state: 1) state of the conversation based on the queries and responses visible to the intent-based query router and 2) state of conversation visible to responding ones of the backend services. Thus, topic transition determined by the intent-based query router would be different than topic transition at each of multiple backend services providing responses for what is a single conversation from the perspective of the intent-based query router. The intent-based query router also uses conversation state to determine whether a conversation times out or triggers some "prodding" due to lack of a query from a user or lack of a response from a backend service within a defined time period. Examples of prodding would be the intent-based query router sending an utterance to a user "Do you require additional assistance?" or refreshing a user query posted to backend services.

At block 304, the intent-based query router assigns a query identifier to the user query and sets state of the user query. The intent-based query router generates a unique identifier for the user query and sets the state to an initial state, such as "received" or "submitted" indicating that the user query has been submitted by a user. The information for a query can be an entry within a table or repository used for conversation state or be a separate table/repository.

At block 305, the intent-based query router pre-processes the user query to create a prompt for intent classification. Pre-processing can be "cleaning up" a user query, such as correcting spelling errors. Pre-processing can also include additional analysis of the user query to increase the likelihood of obtaining a successful intent classification. For example, the intent-based query router can analyze conversation history and conversation context to determine whether additional tokens should be added to the user query to create the prompt or whether tokens should be replaced or modified. For example, the intent-based query router may analyze the conversation history and context and determine based on the analysis that a service identifier and/or product name should be added to the user query to create the prompt. This may be copying an utterance from earlier in the conversation and/or inserting a token based on current customer subscriptions or licenses. The intent-based query router may also evaluate the user query or a prompt formed based on the user query to ensure it is a validly formed prompt for the intent classifier.

At block 307, the intent-based query router submits the prompt for intent classification. Submitting the prompt may be an API call or posting to a queue that is consumed or subscribed to by an intent classification service. Submitting the prompt may be invoking a library defined function the prompt as an argument in the invocation. Operational flow from 307 to 309 is depicted with a dashed line since this may be an asynchronous flow. The intent-based query router may submit multiple prompts to an intent classifier before receiving an intent classification for a previously submitted prompt. The intent-based query router also tags or associates the conversation identifier with the prompt to allow correlation of a predicted intent classification with the appropriate user query.

At block 309, the intent-based query router detects an intent classification response. If successful, the intent classification response indicates one or more predicted intent classes. Otherwise, the intent classification response will indicate a failure (e.g., a failure of a service due to a network issue) or indicate that an intent classification could not be predicted or could not be predicted with sufficient confidence. If the intent classification response indicates a predicted intent classification, then operational flow proceeds to block 311. Otherwise, operational flow proceeds to block 313.

At block 311, the intent-based query router associates the intent class predicted by the intent classifier and a user query identifier with the user query. For example, the intent-based query router creates an object (e.g., a message) with the user query identifier and the intent classification as header information or metadata. Since a conversation may have multiple user queries awaiting responses, the intent-based query router tracks user queries. Tracking the user queries can be with an identifier that incorporates a conversation identifier of the corresponding conversation. For example, the user query identifier can be an incrementing counter concatenated with the conversation identifier. The user query may be a modified version of the user query but is not necessarily the intent prompt version of the user query. Implementations may indicate both the user query as originally received and the modified version in order to obtain a response for each. If multiple intent classifications were obtained for the user query, then the intent-based query router can indicate the multiple intent classifications in the object or create a different object for each intent classification.

At block 313, the intent-based query router attempts to disambiguate the prompt for the intent classifier ("intent prompt") based on additional data. This additional data may be from further dialog, the conversation history, and/or context data. Similar to the additional information described with reference to block 305, the intent-based query router may analyze conversation history, request additional information from a user, and/or query customer attributes. The pre-processing at block 305 may have been linting and rule-based evaluation of spelling and syntax and disambiguating at block 313 would be the first instance of obtaining additional information from analyzing conversation history and/or context data. However, the pre-processing at block 305 may have adding some context data and the disambiguating would be a subsequent pass of the conversation history and context data to further augment or modify the intent prompt. After disambiguating the intent prompt, operational flow returns to block 307. The intent-based query router may be configured to attempt to disambiguate the intent prompt itself a defined number of times before prodding the user for additional information. If the intent-based query router cannot disambiguate the user query, then query routing operations end. Instead, the query may be forwarded to a live assistant or trigger the user prodding.

Figure 4:
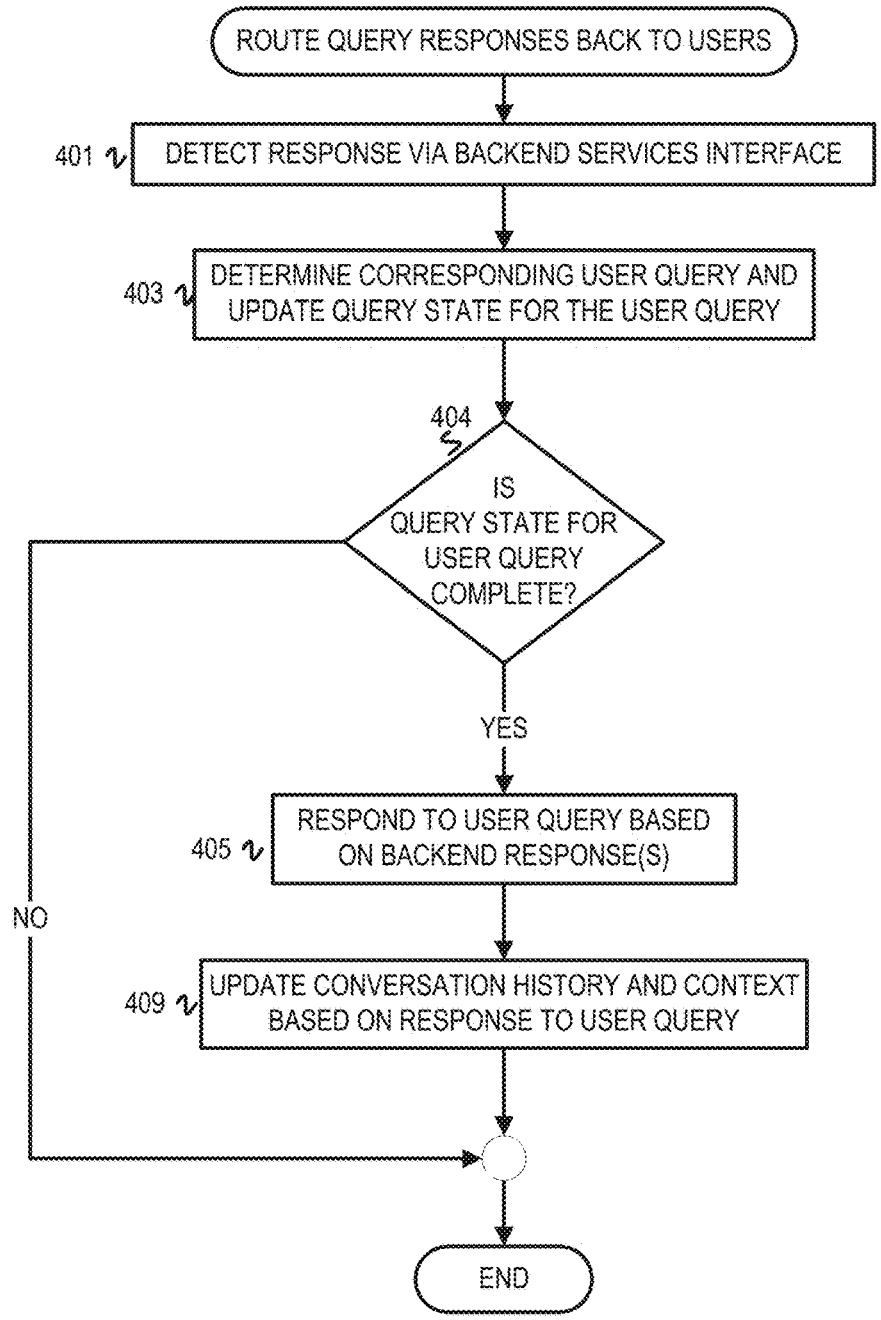
FIG. 4 is a flowchart of example operations for routing query responses back to users.

FIG. 4 is a flowchart of example operations for routing query responses back to users. The intent-based query router may spawn child processes or threads for each conversation and/or have a process/thread that monitors the interface to the backend services for query responses. Thus, the intent-based query router can concurrently obtain intent classifications and router query responses across multiple conversations with multiple users.

At block 401, the intent-based query router detects a response to a user query via a backend services interface. Detection may be event-driven or according to periodic checking of a queue or other posting facility.

At block 403, the intent-based query router determines the corresponding user query and updates the query state for the user query. The user query identifier associated with a user query by the intent-based query router travels with the user query and propagates to the query response. This allows the intent-based query router to correlate the query response to the corresponding user query. Updating the query state can be changing state from "routing" indicating that the query has been posted to the backend services interface to "in progress" indicating that a response has been received but an additional response(s) is expected.

At block 404, the intent-based query router determines whether query state for the user query is complete. A user query may have had multiple intent classifications. If there are x intent classifications for a user query, the intent-based query router will expect x query responses. Therefore, the intent-based query router will maintain a data structure of query states for in-flight or pending user queries to track when all expected query responses have been received. When all expected query responses have been received, then the query state is completed and the intent-based query router responds in the corresponding conversation. The intent-based query router can look up state based on the user query identifier determined at block 403. If the query state is complete, then operational flow proceeds to block 405. Otherwise, operational flow ends for FIG. 4.

At block 405, the intent-based query router responds to the user query based on the backend response(s). The intent-based query router may forward or convey the backend response to the user, for example invoke an API callback or promise function with the backend response as a message payload. In some cases, the intent-based query router edits the response. As an example, the intent-based query router can evaluate a backend service response against attributes of the digital identity associated with a conversation. Based on a role and/or permissions of the digital identity, the intent-based query router may edit the query response to remove information not permitted to be viewed by a user associated with the digital identity. Editing a query response is not limited to cases related to digital identity authorization. In some cases, an organization's policy may specify edit operations to perform on a query response based on detection of keywords or identifiers (e.g., license expiration). Moreover, responding to a query response can include additional processing of multiple query responses. If a user query has multiple responses, the intent-based query router may filter or aggregate the query responses. Similar to editing, the intent-based query router may filter out responses based on authorization of the digital identity used for the conversation. The intent-based query router may rank/prioritize the query responses and select a top n of the query responses according to the ranking. As an example, the backend services may be associated with values used for prioritizing and ranking. For example, a live agent may have a higher priority or ranking value than a response from a conversational agent training on troubleshooting manual. Customer attributes may also be a factor in the ranking. For instance, a customer may have multiple licenses with different expirations dates. The expiration date and quantity of each license can inform the ranking of query responses. To aggregate responses, the intent-based query router may collate the responses, merge the responses, and/or summarize the responses. As an example of merging responses, the intent-based query router can deduplicate token sequences or organize the responses according to prioritization of the backend services providing the query responses. As an example of summarizing, the intent-based query router can invoke a natural language processor with semantic analysis to summarize the responses.

At block 409, the intent-based query router updates conversation history and context data based on its response. For example, the intent-based query router can update conversation history to indicate that the intent-based query router responded to a user query and update the conversation window. For context, the intent-based query router may update the context data to indicate keywords from the query response(s) that satisfy topic criteria (e.g., product names or dates of updates).

Variations

The examples refer to a few query states, but implementations can have more granular states and use different state names. For instance, the state of "complete" may be used only after communicating a query response. Embodiments can use additional states to indicate when a user query is being evaluated for validity, when a user query or prompt generated therefrom has been submitted for intent classification, when a query response has been received but not yet communicated to a user, failure to respond to a user query, and failure to obtain a valid intent classification.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
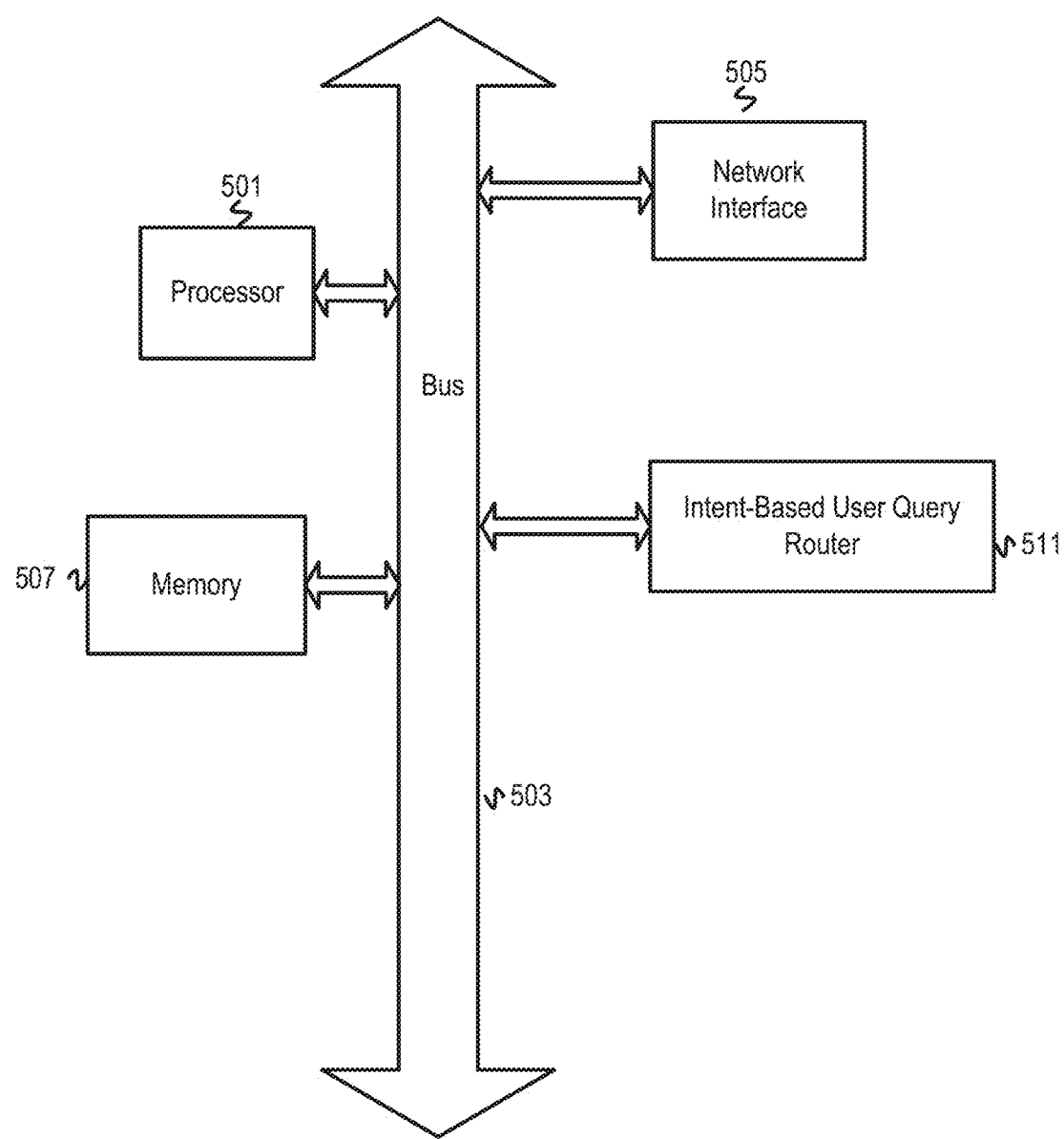
FIG. 5 depicts an example computer system with an intent-based user query router.

FIG. 5 depicts an example computer system with an intent-based user query router. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes an intent-based user query router 511. The intent-based user query router 511 manages user queries and responses to those user queries across multiple conversations. The intent-based user query router 511 tracks state of completion of responses to user queries and tracks progress of in-flight user queries with respect to both intent classification and responses. For each user query, the intent-based user query router 511 obtains a predicted intent class or intent classification from a LLM fine-tuned for intent classification for a user query. The intent-based user query router 511 then tags or associates the user query with the intent classification which is a backend service identifier or maps to a backend service identifier. When the intent-based user query router 511 detects a query response(s) from the backend services and determines that query state for the corresponding user query is complete, the intent-based user query router 511 conveys the response(s) in the corresponding conversation. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
for each prompt submitted during a conversation between a conversation agent and a user,
generating a prompt instructing a large language model (LLM) based intent classifier to classify intent of a first user query from the user, wherein generating the prompt includes incorporating conversation history into the prompt;
submitting the prompt to a set of one or more large language model (LLM) based intent classifiers to obtain at least a first intent classification;
posting the first user query in association with the first intent classification to a queue monitored by a plurality of backend services based, wherein each of the plurality of backend services maps to one or more intent classifications;
detecting a first query response from at least one of the plurality of backend services;
determining that the first query response corresponds to a first of a plurality of conversation identifiers for a conversation that includes the first user query; and
responding to the first user query based, at least in part, on the first query response.

2. The method of claim 1, wherein the first user query is received via a first interface, wherein the first interface is an application programming interface or a user interface.

3. The method of claim 1, wherein posting the first user query comprises:
creating a message with the first user query and with the first intent classification; and
publishing the message to the queue.

4. The method of claim 3, further comprising:
obtaining a second intent classification from the set of LLM based intent classifiers based on the first prompt or a second prompt generated based on the first user query; and
creating the message with the second intent classification in addition to the first intent classification or creating a second message with the first prompt and the second intent classification and publishing the second message to the queue.

5. The method of claim 1, further comprising:
detecting multiple query responses from the plurality of backend services including the first query response;
determining that a query state for the first user query is complete; and
aggregating the multiple query responses into an aggregate response,
wherein responding to the first user query comprises responding with the aggregate response.

6. A non-transitory, machine-readable medium having program code stored thereon, the program code comprising instructions to:
submit a first prompt to a set of one or more large language model (LLM) based intent classifiers to obtain at least a first intent classification, wherein the first prompt is based on a first user query received via a first interface and wherein the set of one or more LLM based intent classifiers is trained with training data comprising tuples of example prompts and backend service identifiers;
route the first user query to at least one of a plurality of backend services based, at least partly, on the first intent classification;
detect a first query response from at least one of the plurality of backend services;
determine that the first query response corresponds to the first user query; and
respond to the first user query based, at least in part, on the first query response.

7. The non-transitory, machine-readable medium of claim 6, wherein the instructions to route the first user query to at least one of the plurality of backend services comprise instructions to:
create a message with the first user query and with the first intent classification; and
publish the message to a first message queue accessed by the plurality of backend services.

8. The non-transitory, machine-readable medium of claim 7, wherein the program code further comprises instructions to:
obtain a second intent classification from the set of LLM based intent classifiers based on the first prompt or a second prompt generated based on the first user query; and
create the message with the second intent classification in addition to the first intent classification or create a second message with the first prompt and the second intent classification and publish the second message to the first message queue.

9. The non-transitory, machine-readable medium of claim 6, wherein the program code further comprises instructions to:
create the first prompt based on the first user query and at least one of conversation history based context and customer based context data.

10. The non-transitory, machine-readable medium of claim 6, wherein the program code further comprises instructions to pre-process the first user query to be a valid prompt.

11. The non-transitory, machine-readable medium of claim 6, wherein the program code further comprises instructions to:
detect multiple query responses from the plurality of backend services, wherein the multiple query responses include the first query response;
determine that a query state for the first user query is complete; and
aggregate the multiple query responses into an aggregate response,
wherein the instructions to respond to the first user query comprise instructions to respond with the aggregate response.

12. The non-transitory, machine-readable medium of claim 11, wherein the instructions to aggregate the multiple query responses into the aggregate response comprise one of instructions to collate the multiple query responses, instructions to summarize the multiple query responses, and instructions to merge the multiple query responses.

13. The non-transitory, machine-readable medium of claim 12, wherein the program code further comprises instructions to rank the multiple query responses and filter the multiple query responses based, at least, in part on the ranking.

14. The non-transitory, machine-readable medium of claim 6, wherein the program code further comprises instructions to edit the first query response based, at least in part, on an attribute of a digital identity associated with the first user query.

15. An apparatus comprising:
a processor; and
a machine-readable medium having instructions stored thereon executable by the processor to cause the apparatus to,
submit a first prompt to a set of one or more large language model (LLM) based intent classifiers to obtain at least a first intent classification, wherein the first prompt is based on a first user query received via a first interface and wherein the set of one or more LLM based intent classifiers is trained with training data comprising tuples of example prompts and backend service identifiers;
route the first user query to at least one of a plurality of backend services based, at least partly, on the first intent classification;
detect a first query response from at least one of the plurality of backend services;
determine that the first query response corresponds to the first user query; and
respond to the first user query based, at least in part, on the first query response.

16. The apparatus of claim 15, wherein the instructions to route the first user query to at least one of the plurality of backend services comprise instructions executable by the processor to cause the apparatus to:
create a message with the first user query and with the first intent classification; and
publish the message to a first message queue accessed by the plurality of backend services.

17. The apparatus of claim 16, wherein the machine-readable medium further comprises instructions executable by the processor to cause the apparatus to:
obtain a second intent classification from the set of LLM based intent classifiers based on the first prompt or a second prompt generated based on the first user query; and
create the message with the second intent classification in addition to the first intent classification or create a second message with the first prompt and the second intent classification and publish the second message to the first message queue.

18. The apparatus of claim 15, wherein the machine-readable medium further comprises instructions executable by the processor to cause the apparatus to:
detect multiple query responses from the plurality of backend services, wherein the multiple query responses include the first query response;
determine that a query state for the first user query is complete; and
aggregate the multiple query responses into an aggregate response,
wherein the instructions to respond to the first user query comprise instructions to respond with the aggregate response.

19. The apparatus of claim 18, wherein the instructions to aggregate the multiple query responses into the aggregate response comprise one of instructions to collate the multiple query responses, instructions to summarize the multiple query responses, and instructions to merge the multiple query responses.

20. The apparatus of claim 19, wherein the machine-readable medium further comprises instructions executable by the processor to cause the apparatus to rank the multiple query responses and filter the multiple query responses based, at least, in part on the ranking.

\* \* \* \* \*